United States Patent
Beier et al.

(10) Patent No.: US 6,510,762 B1
(45) Date of Patent: Jan. 28, 2003

(54) MEMBER COMPRISING SEVERAL LAYERS OF A FLAT MATERIAL AND METHOD FOR MAKING THE SAME

(75) Inventors: Alfred Beier, Braunschweig (DE); Dietrich Distler, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/508,564

(22) PCT Filed: Jul. 29, 1998

(86) PCT No.: PCT/EP98/04744
§ 371 (c)(1),
(2), (4) Date: Mar. 13, 2000

(87) PCT Pub. No.: WO99/14012
PCT Pub. Date: Mar. 25, 1999

(30) Foreign Application Priority Data

Sep. 13, 1997 (DE) .......................... 197 40 286

(51) Int. Cl.⁷ .................... F16H 53/00; F16H 55/12; B23P 15/14; B21D 53/28
(52) U.S. Cl. ................. 74/567; 74/445; 74/448; 74/449; 29/888.1; 29/893.33
(58) Field of Search .................... 74/445, 448, 449, 74/567; 29/893.3, 893.33

(56) References Cited

U.S. PATENT DOCUMENTS

| | | | | |
|---|---|---|---|---|
| 462,994 A | * | 11/1891 | Pfetch ........................ | 74/445 |
| 644,442 A | * | 2/1900 | McElroy ...................... | 74/445 |
| 644,443 A | * | 2/1900 | McElroy ...................... | 74/445 |
| 719,572 A | * | 2/1903 | Evenden ...................... | 74/445 |
| 1,308,160 A | | 7/1919 | Brinton | |
| 1,516,882 A | * | 11/1924 | Constantinesco ............ | 74/445 |
| 1,520,625 A | | 12/1924 | Wigley | |
| 1,561,222 A | * | 11/1925 | Fredrick ...................... | 74/445 |
| 1,737,455 A | * | 11/1929 | Fredrick ...................... | 74/445 |
| 1,761,114 A | * | 6/1930 | Fredrick ...................... | 74/445 |
| 2,394,477 A | * | 2/1946 | Pope et al. .................. | 74/445 |
| 3,225,616 A | * | 12/1965 | Whitehead ................... | 74/445 |
| 4,630,498 A | * | 12/1986 | Santi ........................... | 74/445 |
| 5,016,807 A | | 5/1991 | Haack | |
| 5,583,387 A | | 12/1996 | Takeuchi et al. | |
| 5,836,215 A | | 11/1998 | Beier et al. | |

FOREIGN PATENT DOCUMENTS

| | | |
|---|---|---|
| DE | 26 25 409 | 12/1977 |
| DE | 30 26 685 | 2/1982 |
| DE | 196 06 504 | 8/1997 |

* cited by examiner

Primary Examiner—David A. Bucci
Assistant Examiner—William C Joyce
(74) Attorney, Agent, or Firm—Cohen, Pontani, Lieberman & Pavane

(57) ABSTRACT

A control cam or a gear wheel having a plurality of layers of flat material placed one on top of the other. Each of the layers of flat material is of a multi-part form with partition lines that extend in a direction of planes over the layers of material. At least some of the partition lines of neighboring layers of the flat material are offset in relation to one another. The partition line of a layer of flat material is arranged so that in both circumferential directions it lies approximately equally spaced in relation to a partition line of a neighboring layer of flat material.

18 Claims, 4 Drawing Sheets

MEMBER COMPRISING SEVERAL LAYERS OF A FLAT MATERIAL AND METHOD FOR MAKING THE SAME

PRIORITY CLAIM

This is a U.S national stage of application Ser. No. PCT/EP98/04744, filed on Jul. 29, 1998. Priority is claimed on that application and on the following application:
Country: Germany, Application No.: 197 40 286.0, Filed: Sep. 13, 1997.

BACKGROUND OF THE INVENTION

1. Field of the Invention

The invention concerns a control cam or gear wheel comprising a plurality of layers of flat material stamped out or finely cut and placed one on top of the other in a sandwich-like manner. The invention also concerns a respective method for making such a cam or gear wheel.

2. Discussion of the Prior Art

A connecting rod comprising a plurality of layers of flat material stamped out or finely cut and placed one on top of the other in a sandwich-like manner for a reciprocating-piston internal combustion engine is disclosed, for example, in German reference DE 3841205 C2.

An external gear wheel comprising a plurality of layers of lamellar flat material placed flat one on top of the other is disclosed in German reference DE 3026685 A1, each individual layer of flat material having a plurality of openings, some of which are intended for receiving rivets to ensure in this way that the individual layers are held together.

A control cam comprising a plurality of layers of flat material connected to one another is known, for example, from German reference DE 4423107 A1.

The above-mentioned, known gear wheels or control cams consequently share the common feature that the individual layers of flat material are prepared by stamping or fine cutting. One disadvantage here may be the relatively high proportion of scrap, this disadvantage being all the more serious the greater the material thicknesses or grades of material used for the layers of flat material.

SUMMARY OF THE INVENTION

The invention is based on the object of providing a control cam of the generic type or a gear wheel of the generic type which makes it possible to use a reduced amount of material in comparison with conventional control cams and gear wheels. Furthermore, a method for respectively making them is to be provided.

According to the invention, it is provided that the individual layers of flat material altogether forming the control cam or gear wheel are of a multi-part form, with partition lines extending in the direction of the planes of layers of material. At least some of these partition lines of neighboring layers of flat material are arranged offset in relation to one another. Consequently, each individual layer of flat material is advantageously divided into at least 2 segments, which makes possible a material-saving arrangement of individual segments on a strip of material fed to a stamping die. To continue to ensure the strength of the control cam or gear wheel divided up into a greater number of individual parts by the segmentation of the individual layers of flat material, the individual segments are subsequently placed together to form the layers of flat material, the partition lines of one layer of flat material that extend between the individual segments being arranged offset in relation to the partition line or lines of other layers of flat material, preferably the neighboring layers.

It is preferably provided that the gear wheel is of a circular or annular form with a central opening, it in turn being preferred for the partition lines to be arranged extending radially from inside to outside.

It is also preferably provided that the individual segments are portions of a circular ring and at the same time bear a toothing on the outside and/or inside, so that, in the state in which they are placed together and one on top of the other, the gear wheel is produced. This may be both an externally toothed gear wheel and an internally toothed gear wheel or an annular gear bearing an external toothing and an internal toothing.

Such a construction according to the invention has, for example, considerable advantages in the preparation of internal gear pumps. While, until now, the outer ring, bearing the internal toothing, had to be adapted to the respective loading situation by making it from a high-grade metallic material by broaching, involving a correspondingly high loss of material, from now on this gear wheel is prepared from a plurality of layers of flat material which for their part in turn comprise segments. The segments can be stamped out in a closely interlinked manner and subsequently put together. The same applies to the inner wheel, provided with an external toothing.

Particularly preferably, each layer of flat material may comprise more than two, in particular three or four, segments, the partition lines of neighboring layers of the material lying approximately equally spaced apart in relation to one another.

For certain applications, it may be advantageous for the individual layers of flat material to be securely connected to one another in the state in which they are placed one on top of the other. For external gear wheels, for example, the necessary strength is provided in this way. For other applications, for example a pump delivering lubricating oil, however, it may be possible to dispense with a connection between neighboring layers of flat material, since the individual segments within the layers of flat material stabilize themselves in the installed state. In this case, it may be advantageous for assembly purposes to connect the individual segments of the layers of flat material to one another initially by means of pins, these pins subsequently being removed again.

For a further, preferred application, individual layers of flat material in the placed-together state may be of a cam-shaped form, the layers of the material, in the state in which they are placed one on top of the other, altogether forming the control cam according to the invention for the charge-cycle valve control of a reciprocating-piston internal combustion engine.

In this case, it may be provided that the individual segments of one layer of flat material are not identically designed, as for instance in the case of the gear wheel described above.

A method according to the invention for making a gear wheel or control cam of this kind provides that firstly a plurality of segments are stamped out or finely cut and subsequently the gear wheel or control cam is formed by grouping together a certain number of segments to give a layer of flat material and subsequently arranging a plurality of such layers of flat material one on top of the other to form a structural unit. The partition lines between the segments within each layer of flat material are not arranged in line one above the other but are offset in relation to one another, at least between some neighboring layers of flat material.

Depending on the number of segments per layer of flat material and depending on the intended purpose of the gear wheel or control cam, in this method each layer of flat material can firstly be formed by correspondingly placing the segments together, whereupon subsequently the gear wheel or control cam is completed by placing a plurality of such layers of flat material one on top of the other. However, as a departure from this, it may be advantageous firstly to stack a plurality of segments of neighboring layers of material one on top of the other and subsequently to complete the individual layers of flat material by adding further segments.

For production engineering reasons, it may also be advantageous already to provide during the stamping or fine cutting at least one receiving means in each segment for a connecting means. It is consequently possible during the grouping together for the individual segments to be threaded on, for example onto rod-shaped connecting means in the form of centering pins or spigots. These rod-shaped connecting means may additionally receive a rivet, which subsequently holds the flat material together, or may themselves be designed as a rivet, so that the connecting means is initially used for grouping together and subsequently remains permanently in the gear wheel or control cam for holding it together.

BRIEF DESCRIPTION OF THE DRAWINGS

Further advantages and features of the invention emerge from the dependent claims and the exemplary embodiment explained in more detail below with reference to a drawing, in which:

DETAILED DESCRIPTION OF THE PREFERRED EMBODIMENTS

Figure 1:
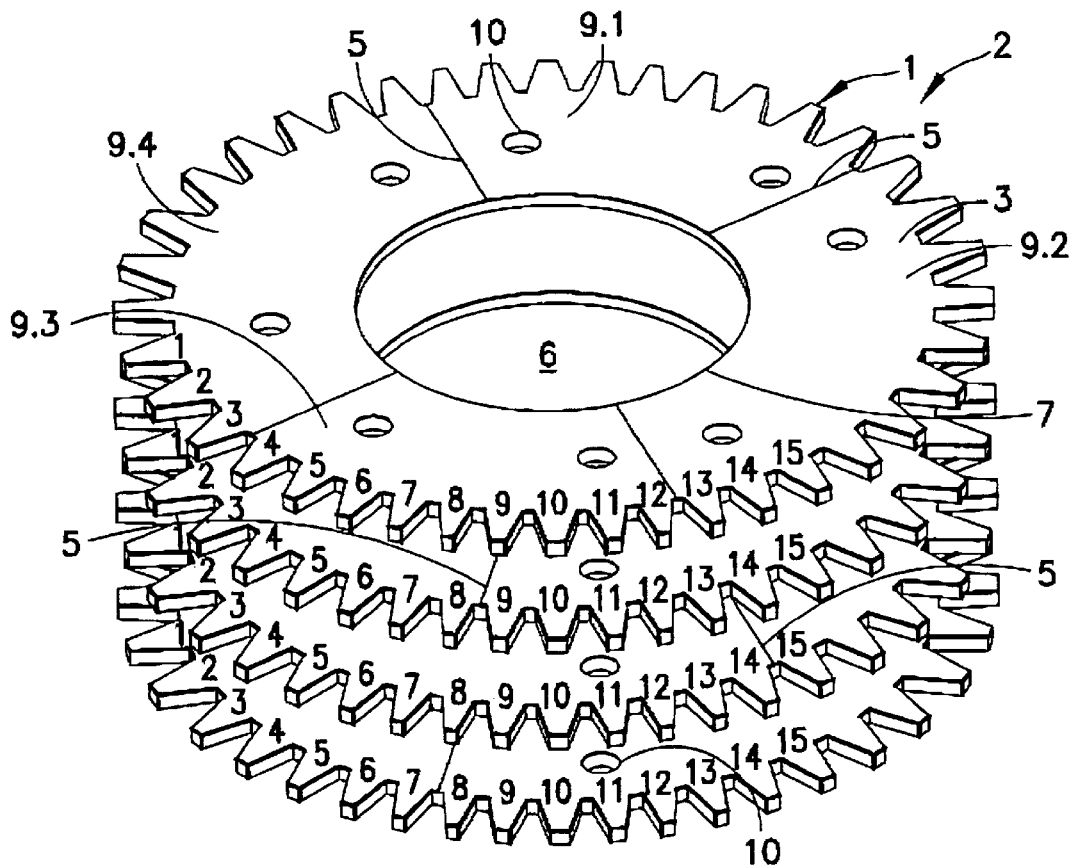
FIG. 1 perspectively shows a gear wheel designed as an external gear wheel and comprising a plurality of layers of flat material, before they are placed one on top of the other.

FIG. 1 shows an embodiment in which the gear wheel is formed as a gear wheel 2 bearing an external toothing 1. This gear wheel 2 is formed altogether from a plurality of layers of flat material 3, which are stamped out from a strip of material 4.

The individual layers of flat material 3 are in turn of a multi-part form, partition lines 5 extending in the direction of the planes of the layers of material that essentially accommodate the layers of flat material 3.

In the placed-together state, the individual layers of flat material 3 have a central opening 6, from the opening rim 7 of which the partition lines 5 extend essentially radially outward to an outer circumferential line 8 of each layer of flat material 3.

The gear wheel 2 according to FIG. 1 has for each layer of flat material 3 a total of four segments 9.1, 9.2, 9.3 and 9.4, which in the placed-together state adjoin the partition lines 5. It can also be seen that the partition lines 5, for example of the uppermost layer of flat material 3, are arranged offset in relation to the partition lines 5 of the neighboring layer of flat material 3.

During the stamping of the individual segments 9.1 . . . , receiving means in the form of openings 10 may be provided in the segments at the same time. The openings form in the placed-together state of these individual segments 9.1 . . . , and the state in which the individual layers of flat material 3 are placed one on top of the other, a through-opening for receiving a connecting element 11, for example in the form of a rivet.

Figure 2:
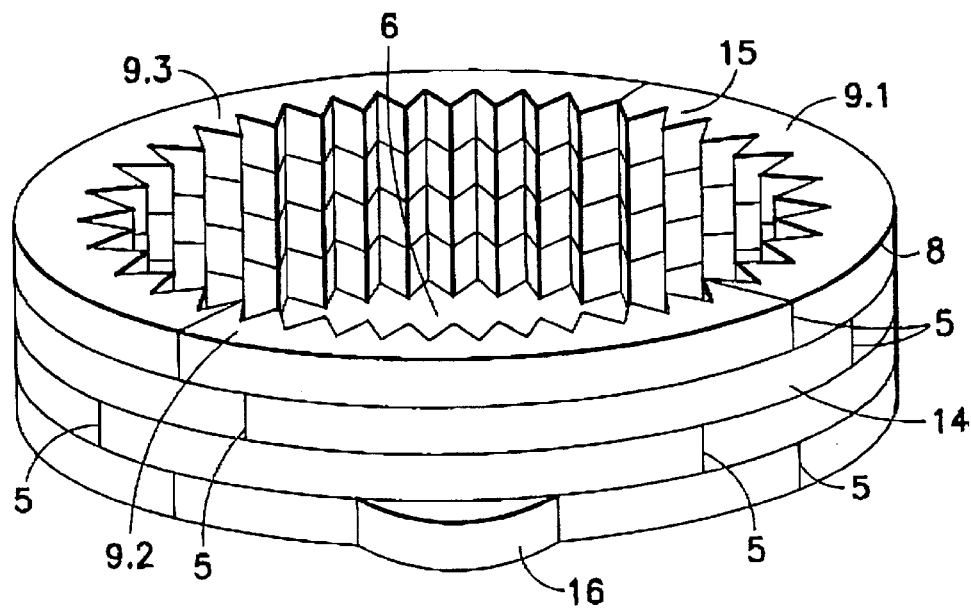
FIG. 2 perspectively shows a gear wheel designed as an internal gear wheel in the assembled state.

The embodiment according to FIG. 2 shows a gear wheel designed in the form of an internal gear wheel in the assembled state. Each layer of flat material 3 is formed by segments 9.1, 9.2 and 9.3 extending over an angular range of 120°. The central opening 6 may, for example, be used for receiving an externally toothed gear wheel 2 according to FIG. 1. The segments 9.1 . . . according to FIGS. 1 and 2 respectively represent portions 12 of a circular ring, which bear on one of their arcuate portions 13 or 14 a toothing 15. In the case of the gear wheel 2 bearing an external toothing according to FIG. 1, the inner arcuate portions 13 are smooth-faced, for example for receiving a driving shaft, while according to FIG. 2 the outer arcuate portions 14 are smooth-faced. If the gear wheel according to FIG. 2 is, for example, to be part of an internal gear pump for delivering oil, for example, individual segments 9.1 . . . may have on their arcuate portions 14 projections 16, deviating from this arcuate form, or correspondingly designed depressions (not shown) for positional fixing.

It goes without saying that the gear wheel 2 according to FIG. 1 may have an opening 6 deviating from a circular shape for providing a torsionally fixed connection.

The connection of the individual layers of flat material to one another may be performed in any conceivable way, one possibility by means of connecting element 11 already having been explained. Similarly conceivable, however, depending on the application, are also adhesive bonds, laser welds or positive claw-like engagements.

Figure 3:
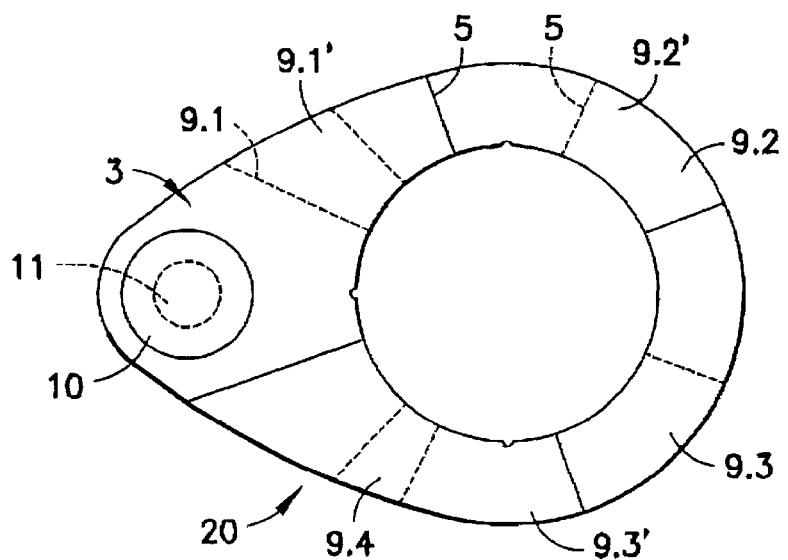
FIG. 3 shows a control cam according to the invention.
Figure 3A:
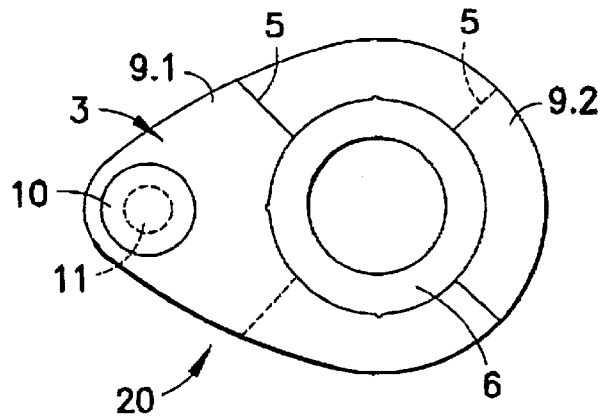
FIGS. 3a–3c show a control cam according to the invention.
Figure 3B:
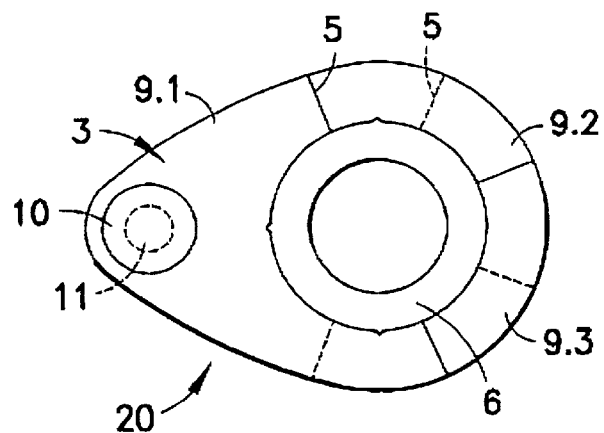
Figure 3C:
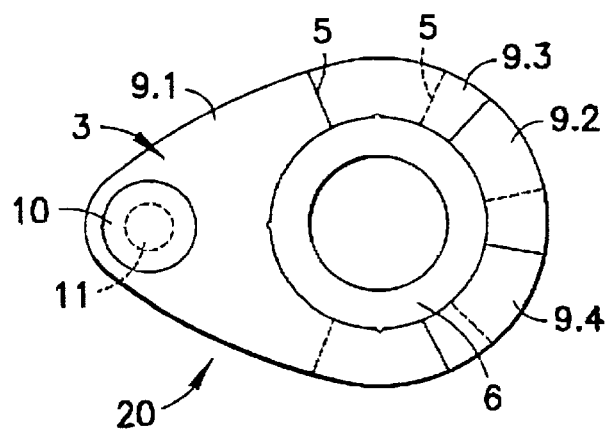

While in the case of the gear wheels according to FIG. 1 and FIG. 2 the segments 9.1 . . . are preferably designed as identical parts, the segments 9.1, 9.2 . . . of the control cam according to FIGS. 3–3c are preferably not identically designed. FIG. 3 shows in plan view a cam 20 according to the invention, which is altogether formed from a plurality of stamped-out layers of flat material 3. The uppermost layer of flat material 3, lying in the plane of the drawing, has the partition line 5, which extends obliquely with respect to the cam profile and in which the segments 9.1 and 9.2 adjoin each other. By turning every second layer of flat material 3 after stamping and before the individual layers are placed one on top of the other, the partition line 5 of the first layer of flat material, lying below the plane of the drawing, lies in the position represented by dashed lines. In FIG. 3a the partition lines of one layer are approximately equally spaced relative to the partition lines of a neighboring layer. FIG. 3b shows of the layers having three partition lines, and FIG. 3c shows the layers having four partition lines.

Figure 4:
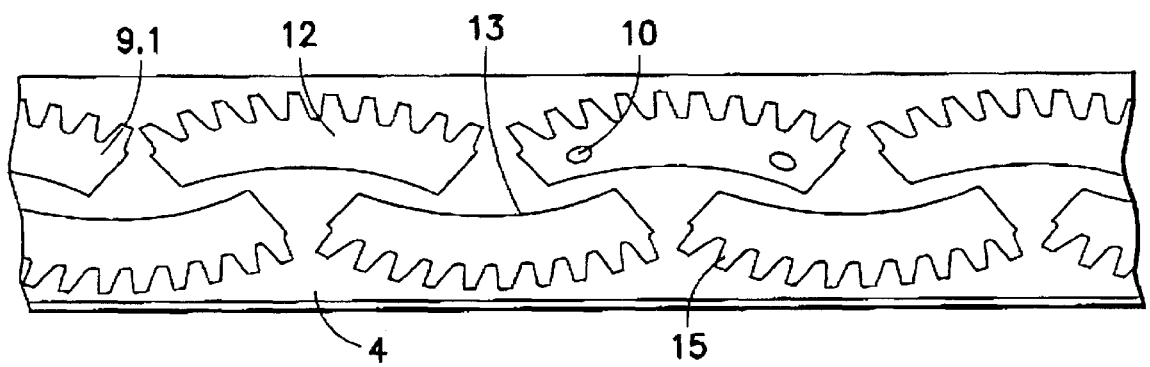
FIG. 4 perspectively shows the arrangement of a plurality of segments on a strip of material.

FIG. 4 shows in a greatly schematized form a strip of material 4 which consists of a heat-treatable steel Ck 37 and on which the layer of segments 9.1 . . . still to be stamped out is represented. It is possible to see the arrangement of the individual segments 9.1 . . . , lying close together and if need be interlinked, for material-saving utilization of the strip of material 4 and, to the greatest extent, avoidance of scrap. If the gear wheels were stamped in a way according to FIGS. 1 and 2 from one-piece layers of flat material 3, the strip of material 4 would have to be at least as wide as the outside diameter of the gear wheels.

Figure 5:
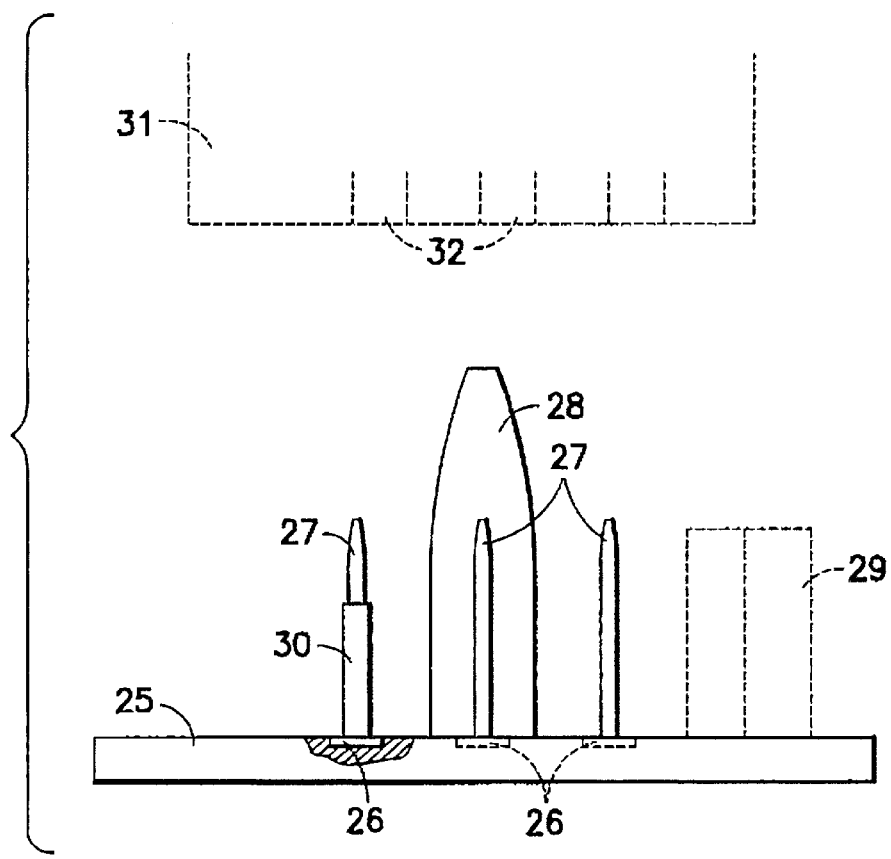
FIG. 5 schematically shows in a side view an apparatus for grouping together layers of flat material.
Figure 6:
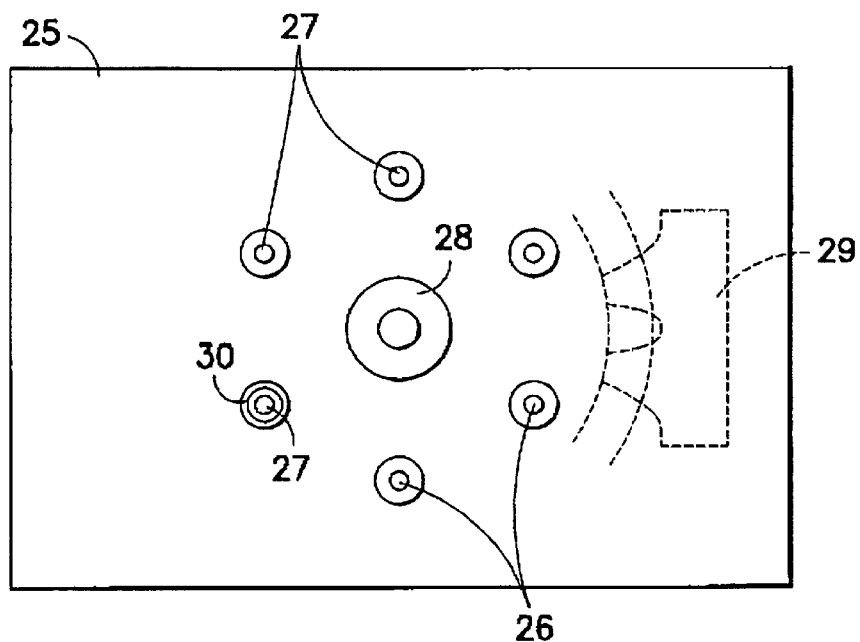
FIG. 6 shows a plan view of FIG. 5.

FIG. 5 shows an apparatus for grouping together the layers, having a base plate 25 and depressions 26 which are arranged on the base data 25 and into which rod-shaped connecting elements designed as pins 27 are inserted. A centering spigot 28, engaging into the opening 6, can be seen in the center, while an aligning element 29, engaging into the toothing 1, 15, is optionally arranged on the right-hand side.

The pins 27 may, as represented on the left in FIG. 5, receive a rivet 30, which passes through the openings 10 in the individual segments 9.1, . . . . Alternatively, the pins 27 may themselves serve as connecting elements 11.

During the stamping out of the individual segments 9.1, . . . , a plurality of openings 10 are preferably stamped out in such a way that, in spite of the lateral offset of the partition lines 5 between neighboring layers of flat material 3, there is in each case in the completed gear wheel or control cam a row of openings 10 lying vertically one above the other, cf. FIG. 1. Above the centering spigot 28, an upper die 31 can be seen, the individual die heads 32 of which are assigned to the pins 27 or the rivets 30.

The invention also offers the advantage that changes to the gear wheel or control cam can be carried out in a comparatively easy way. Changes with respect to the toothings or the cam contours can be accomplished in a simple way by exchanging the stamping tool. Furthermore, by a suitable choice of material for the strip of material 4 and by fine cutting and the subsequent grouping together, the gear wheel or control cam is completed without any further finishing work being required.

The invention is not limited by the embodiments described above which are presented as examples only but can be modified in various ways within the scope of protection defined by the appended patent claims.

What is claimed is:

1. A control cam, comprising a plurality of layers of flat material placed on top of one another, each of the layers of flat material being of a multi-part form with partition lines extending in a direction of planes of the layers of material, at least some of the partition lines, of neighboring layers of the flat material, being offset in relation to one another.

2. A control cam as defined in claim 1, wherein the partition lines extend in a rectilinear manner.

3. The control cam as defined in claim 1, wherein the layers of flat material have a central opening and the partition lines extend essentially radially from a rim of the opening up to an outer circumferential line of the layer of flat material.

4. The control cam as defined in claim 1, wherein the layers of flat material have, in a placed together state, a central opening and more than two partition lines that extend radially outward from the opening.

5. A control cam as defined in claim 4, wherein each layer of flat material has three partition lines.

6. A control cam as defined in claim 4, wherein each layer of flat material has four partition lines.

7. A control cam as defined in claim 4, wherein the partition lines are arranged so as to be spaced equally apart within individual layers of flat material to form segments lying between the partition lines and forming the individual layers of flat material.

8. A control cam as defined in claim 7, wherein each segment of a layer of flat material is connected separately to a segment of a neighboring layer of flat material.

9. A control cam as defined in claim 8, wherein each layer has at least one opening, and further comprising a connecting element arranged in the opening.

10. A control cam as defined in claim 1, wherein the layers of flat material are one of stamped-out and cut.

11. A method for making a control cam comprising a plurality of layers of flat material for a charge-cycle valve control of a reciprocating-piston internal combustion engine, comprising the steps of:
a) producing a plurality of segments from a strip of material; and
b) grouping together a certain number of segments, including:
b1) forming a layer of flat material from the plurality of segments, with partition lines extending between the segments; and
b2) forming the control cam from a plurality of layers of flat material placed on top of one another, and positioning the individual layers of flat material relatively in relation to one another so that partition lines of neighboring layers of flat material lie approximately equally spaced in both circumferential directions in relation to one another.

12. A method as defined in claim 11, wherein the producing step includes stamping-out the segments from the strip of material.

13. A method as defined in claim 11, wherein the producing step includes cutting the segments from the strip of material.

14. A method as defined in claim 11, including carrying out step b1) first and then step b2).

15. A method as defined in claim 11, including connecting neighboring layers of flat material to one another with a connecting element.

16. A method as defined in claim 15, wherein step a) includes producing at least one receiving means for the connecting element in individual segments and step b) includes grouping together the segments by threading the segments by their receiving means onto rod-shaped connecting elements.

17. A method as defined in claim 16, wherein the connecting elements remain permanently in the control cam.

18. A control cam, comprising a plurality of layers of flat material placed on top of one another, each of the layers of flat material being of a multi-part form with partition lines extending in a direction of planes of the layers of material, at least some of the partition lines, of neighboring layers of the flat material, being offset in relation to one another, the partition line of a layer of flat material being arranged so that in both circumferential directions it lies approximately equally spaced in relation to a partition line of a neighboring layer of flat material.

* * * * *